Jan. 5, 1971 A. L. PERCIVAL 3,552,166
FORMING OF ANNULAR WORKPIECES
Filed Jan. 29, 1968 6 Sheets-Sheet 1
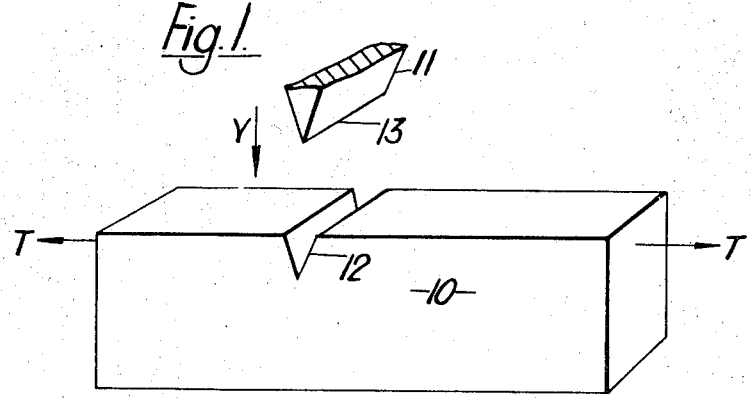
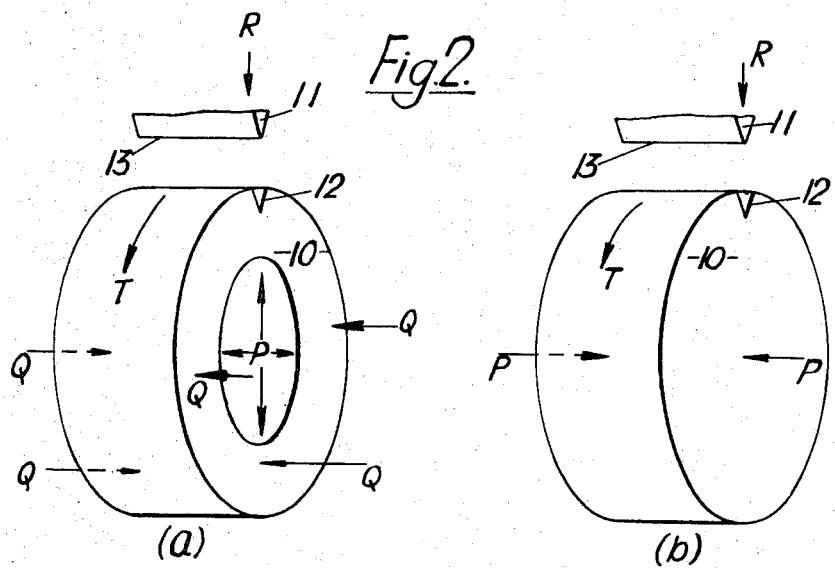
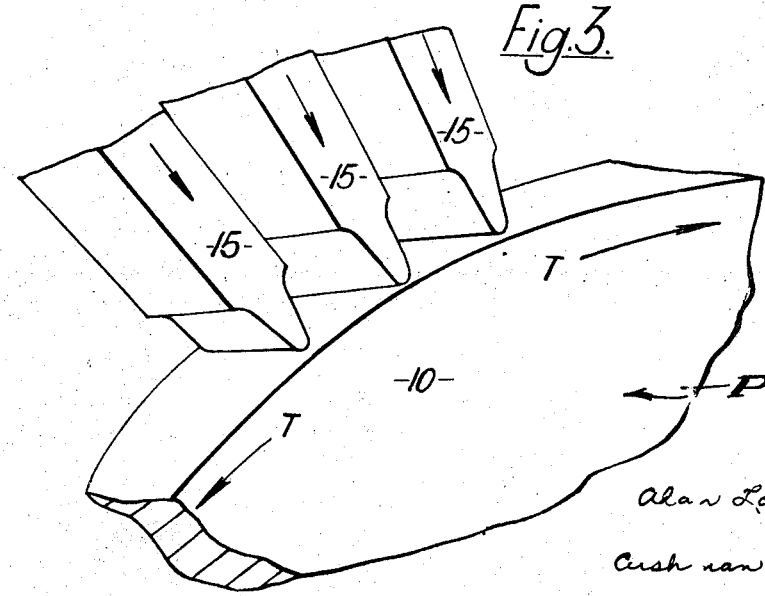
Inventor
Alan Lawrence Percival
By
Cushman, Darby & Cushman
Attorneys Jan. 5, 1971  A. L. PERCIVAL  3,552,166

FORMING OF ANNULAR WORKPIECES

Filed Jan. 29, 1968  6 Sheets-Sheet 4

Inventor
Alan Lawrence Percival
By
Cushman, Darby & Cushman
Attorneys

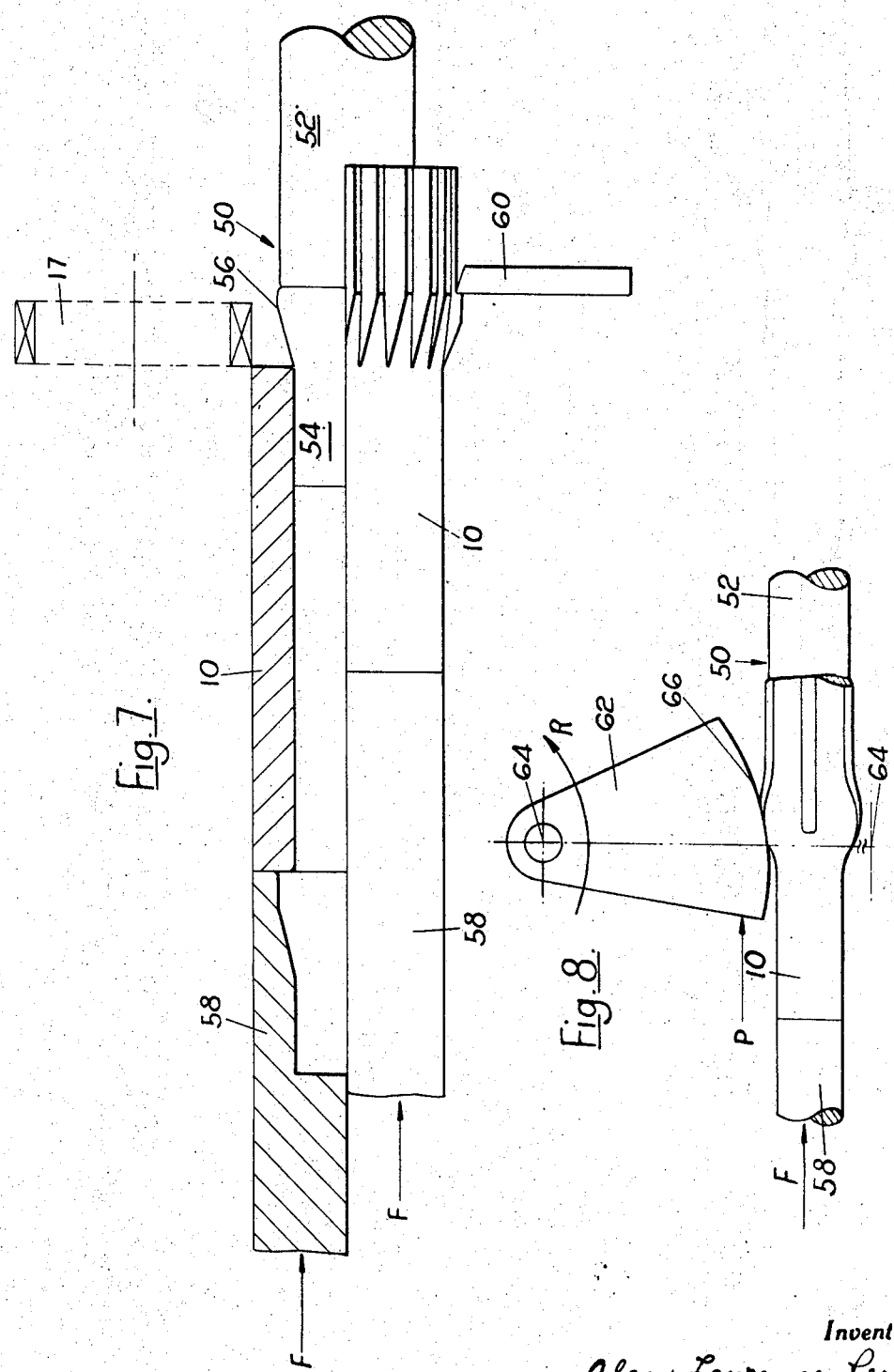

United States Patent Office 3,552,166
Patented Jan. 5, 1971

3,552,166
FORMING OF ANNULAR WORKPIECES
Alan Lawrence Percival, Cambridge, England, assignor to National Research Development Corporation, London, England, a British corporation
Filed Jan. 29, 1968, Ser. No. 701,225
Int. Cl. B21h 5/02; B21k 1/30
U.S. Cl. 72—58
12 Claims

ABSTRACT OF THE DISCLOSURE

A method of forming a workpiece comprising moving a forming tool relative to at least a part of the workpiece to effect forming by plastic flow and applying a tensile stress to at least a part of the workpiece during the forming in a direction substantially perpendicular to the direction of said relative movement so as to assist at least part of the forming process.

---

This invention comprises improvements in or relating to forming of workpieces.

According to the invention in one aspect thereof, there is provided a method of forming a tubular workpiece comprising applying radially outward forces to the inner curved surface of the workpiece over successive axially spaced portions thereof so that said portions are radially expanded and a tensile hoopstress is developed in the outer circumferential surface thereof, and substantially simultaneously, moving a forming tool relative to said portions to effect forming the circumferential surfaces of said portions under conditions of plastic flow.

An expander mandrel may be disposed within the workpiece, successive axial portions of the workpiece being expanded by relative axial movement of the workpiece and the mandrel.

The forming tool may move so as to aid the relative axial movement during forming of the workpiece.

According to another aspect of the present invention, there is provided a method of forming an annular workpiece comprising moving a forming tool relative to at least a part of the periphery of the workpiece and substantially simultaneously applying a tensile hoop stress to the outer circumference of the workpiece by subjecting the workpiece to the combined effect of the application of hydraulic pressure in the space within the workpiece and of compressive forces applied axially to the end faces of the workpiece, whereby forming is effected under conditions of plastic flow.

In another aspect of the invention there is provided apparatus for forming a workpiece comprising an expander mandrel insertable within the workpiece, and means to relatively axially move the mandrel and the workpiece so as to radially expand successive axial portions of the workpiece, and a forming tool so positioned as to form each portion of the workpiece during expansion thereof.

The forming tool may comprise a rotatable carrier having mounted thereon a plurality of rotatable toothed forming wheels the axes of rotation of which are parallel to the axis of rotation of the carrier, the workpiece holder being arranged so that the workpiece is held thereby with its axis of symmetry coincident with the axis of rotation of the carrier, the toothed wheels being arranged, on rotation of the carrier and expansion of the workpiece or a portion thereof, to form spaced apart indentations in the edge of the workpiece.

The carrier and the toothed wheels may be driven rotatably by a common motor by way of respective gearing, for example in unison by a rotatable annular gear member having internal gear teeth which mesh with the teeth of each forming wheel.

There may be provided a trimming tool mounted for rotation with the carrier and adapted to trim the surface of each axial portion of the workpiece after the forming thereof.

In another preferred embodiment, the apparatus for forming an annular workpiece comprises a workpiece holder, and a forming tool to form indentations in the edge of the workpiece, the workpiece holder including a ram device to apply a compressive force to the radially inner portion of the workpiece to cause a tensile stress in the periphery thereof, the ram device including hydraulic intensifier piston means to intensify the applied hydraulic pressure, fluid being contained within the annular workpiece to transmit the intensified pressure to the inner curved surface of said workpiece, means to move the forming tool relative to the workpiece to form the latter.

The ram device may further comprise an outer piston to which said hydraulic pressure is also applied, the outer piston having a hollow stem within which the hydraulic intensifier piston is slidably disposed, said outer piston being adapted to engage the workpiece sealingly and to exert a thrust having an axial and a radially outward component on an axial end of the workpiece, the radially outward component being such as to assist in providing an even radial expansion of the outer curved surface of the workpiece.

In another preferred embodiment, the apparatus for forming an annular workpiece comprises a workpiece holder, a forming tool mounted for movement relative to the workpiece, means to effect said relative movement, two pistons arranged on opposite sides of the workpiece, means for moving said two pistons towards the workpiece when said relative movement occurs to apply opposed axial compressive forces thereto so as to expand the workpiece radially and cause plastic flow in its periphery and a lazy tongs linkage to constrain the pistons to equal and opposite movement.

Yet another type of forming tool is preferably mounted for rotation about a fixed point, the operative edge of the tool being adapted to roll on the expanded portion of the workpiece, forming an indentation therein and aiding said relative movement of the workpiece and the mandrel.

The invention will be described, merely by way of example, with reference to the accompanying drawings, in which:

FIG. 1 illustrates diagrammatically the principle of the invention;

FIGS. 2a and 2b illustrate diagrammatically the application of the invention to the forming of annular and disc-like workpieces respectively;

FIG. 3 is a diagrammatic view of part of apparatus according to one embodiment of the invention;

FIG. 7 is a diagrammatic view, partially in axial section of another embodiment of the invention;

FIG. 8 shows a modified form of the invention of FIG. 7, and

Figure 4:
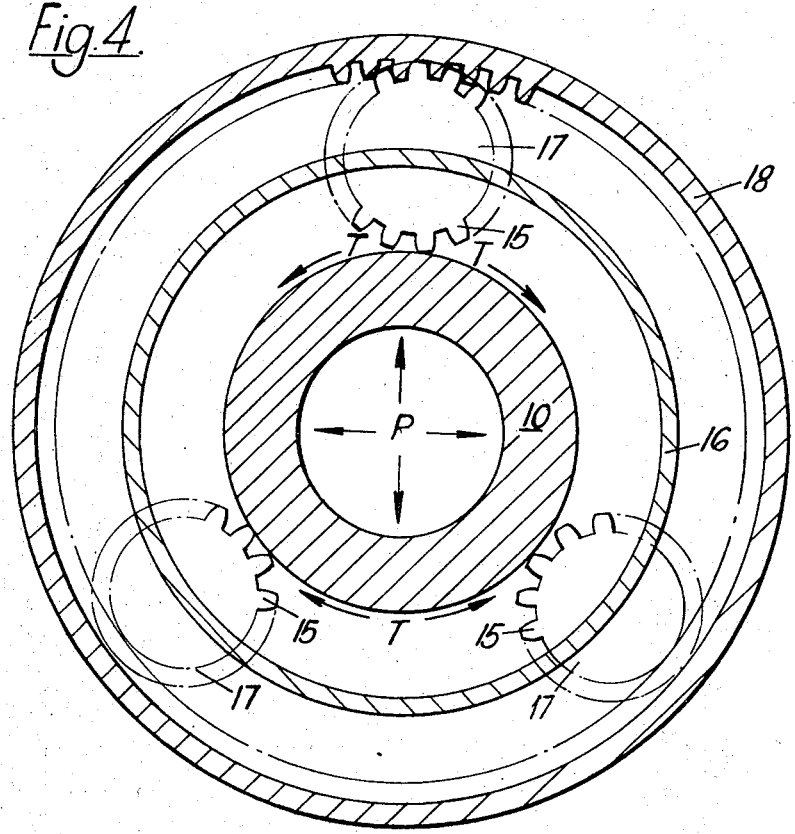
FIG. 4 is a cross section through part of apparatus according to another embodiment of the invention, taken on the line 4—4 of FIG. 5.

FIG. 1 illustrates a simple forming operation on a workpiece 10. A forming tool 11 is moved relatively to the workpiece in the direction of arrow Y to make a local deformation 12 therein. It has been found that if the workpiece 10 is put under a tensile stress T acting in a direction perpendicular to the direction Y of relative movement of the forming tool 11 then the forming operation is facilitated and less force is required to be applied by the forming tool 11 to produce a given deformation 12. Where the forming tool 11 has an elongated forming edge 13, as illustrated, the tensile stress T is applied in a direction perpendicular to the direction Y and inclined at an angle (in this case 90°) to the direction of the forming edge 13.

FIGS. 2a and 2b illustrate the application of the invention to the forming of indentations 12 in the edges of an annular workpiece 10 (FIG. 2a) and a disc-like workpiece 10 (FIG. 2b). In this case one or more forming tools 11 is or are moved relatively to the workpiece in a radial direction R and a compressive force is applied to the central portion of the workpiece. With an annular workpiece 10 as shown in FIG. 2a a pressure P is applied internally of the annulus either alone or in combination with an axial pressure Q. Where the workpiece 10 is a solid disc (FIG. 2b), a pressure P is applied axially over the end surfaces of the workpiece 10. The application of the pressure P, or P and Q, in each case causes expansion of the workpiece 10 to take place radially over all or part of its axial length, and this gives rise to the required tensile stress T in the edge of the workpiece in a direction at right angles to the direction of movement R of the forming tool 11 and at an angle to the edge 13 of the forming tool. Thus the conditions shown in FIG. 1 are established and the forming of the indentations 12 in the workpiece 10 is facilitated.

The invention as illustrated in FIGS. 2a and 2b is clearly applicable to the forming of gear teeth on gear wheel blanks. In this case the forming tool 11 may comprise a plurality of radially inwardly extending forming teeth arranged at equal angular intervals around and close to the edge of the workpiece 10 so that, on application of the pressure P, or P and Q, the workpiece 10 expands radially outwardly and, where the workpiece 10 on expansion flows around respective forming teeth respective indentations are made to form respective gear teeth in the workpiece by the simultaneous radially inward movement of the forming teeth relative to the workpiece 10. The forming teeth may be shaped so as to produce the required gear tooth profile on the workpiece 10. Thus referring to FIG. 3 there is provided a plurality of equi-angularly spaced apart radially inwardly facing forming teeth 15 each of which has a predetermined profile at its radially inner end. When the workpiece 10 expands radially outwardly under the action of the pressure P, or P and Q, forming is effected by the simultaneous radially inward movement of the teeth 15, the workpiece 10 flowing plastically around the teeth 15 to form a plurality of angularly spaced apart gear teeth thereon.

An alternative embodiment of the invention employs a forming method in which the forming tool is moved relatively to the workpiece. Apparatus for carrying out this method is illustrated in FIGS. 4 to 6.

Referring to FIG. 4 an annular workpiece 10 is mounted coaxially with the axis of rotation X—X of a rotatable carrier 16. A plurality, in this case three, of rotatable planet wheels 17 is mounted on the carrier 16, each planet wheel 17 having a plurality of forming teeth 15 thereon which engage the outer surface of the workpiece 10. The carrier 16 and the planet wheels 17 are rotated independently of each other so that the wheels 17 execute planetary motion about the workpiece 10, the forming teeth 15 engaging the outer surface of the workpiece 10 at equal angular intervals determined by the relative rotational speeds of the carrier 16 and the planet wheels 17. At the same time internal pressure P is applied to the interior of the annular workpiece 10, with the result that, as shown in FIG. 2a, the workpiece 10 expands radially outwardly and simultaneously a circumferentially directed tensile stress T is produced in the outer surface of the workpiece 10.

Figure 5:
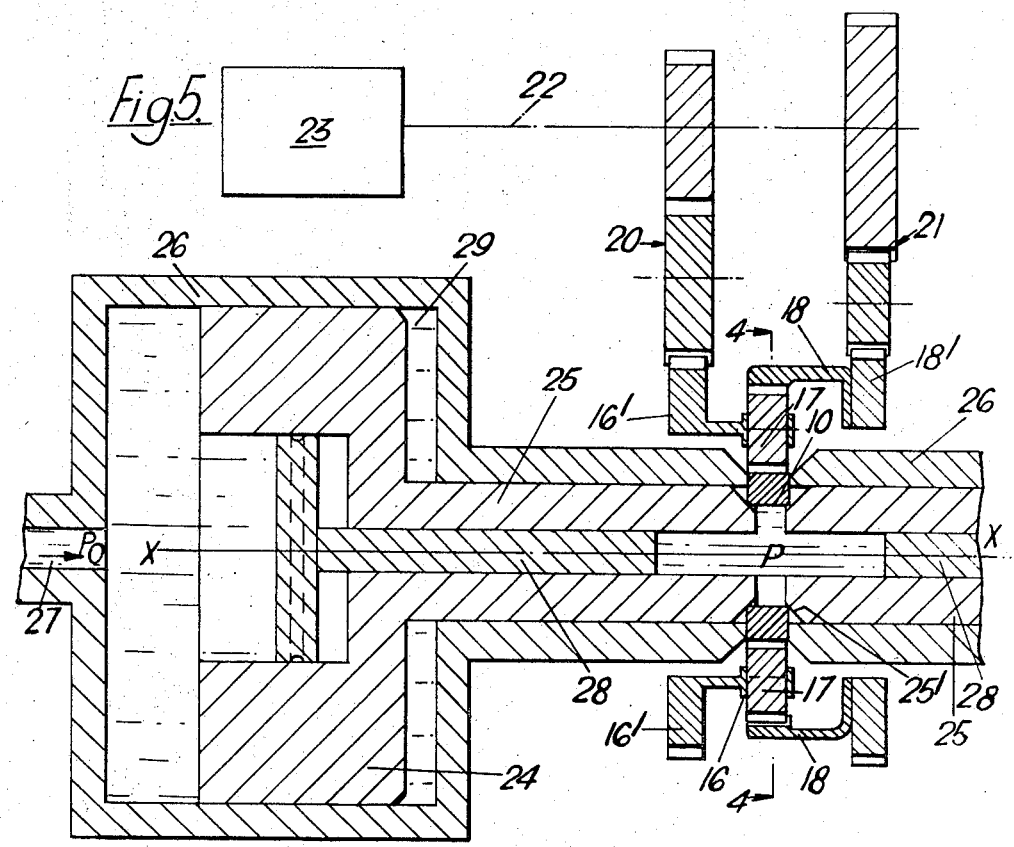
FIG. 5 is a diagrammatic partial view in axial section of the apparatus shown in FIG. 4.
Figure 6:
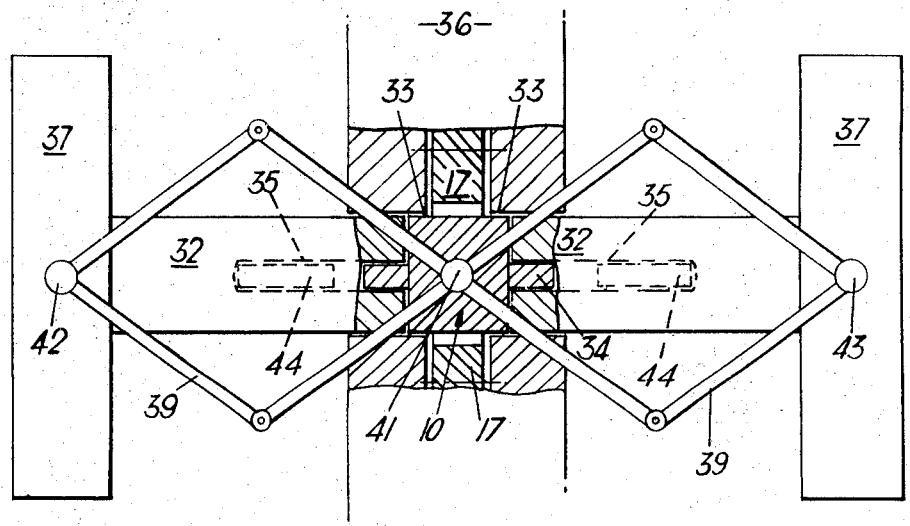
FIG. 6 is a simplified side elevation of part of an alternative form of apparatus according to the invention.

In the embodiment of FIGS. 4 to 6, the profile of each of the forming teeth 15 is arranged to be such that the resultant angularly spaced apart indentations formed on the surface of the workpiece 10 correspond to a desired gear tooth profile. Thus each forming tooth 15 will in general have a shape which corresponds to the conjugate of the gear tooth profile which it is desired to form, allowance being made in the shape of the forming tooth 15 for the formation of the desired addendum and dedendum of the gear teeth to be formed.

Between the passage of successive planet wheels 17, the surface of the workpiece 10 undergoes an incremental approximately radial outward movement. The tensile stress passes through the roots of the partially formed teeth and completely round that part of the workpiece which lies within the teeth so far developed. During the passage of the next planet wheel 17, the workpiece is formed (i) by action of the forming teeth 15 in modifying the profile of the parts of the gear teeth already formed and, (ii) by action of the tips of the forming wheel teeth in deepening the indentation by restoring the surface to the position it occupied before the incremental outward movement took place. It is in aspect (ii) that the tensile stress is advantageous.

If it is desired to produce involute gears, the forming teeth 15 may be so designed that during forming the pitch circle of any forming gear or planet wheel 17 coincides or very nearly coincides with its tip circle. Such forming gears may be called "all dedendum" forming gears. The gears they produce are "all addendum" when meshed with the forming gears, but would mesh in the normal way (partly addendum and partly dedendum) with other gears of customary design. The adoption of this design of forming gear is advantageous as it minimises sliding movement between the tips of the forming teeth 15 and the surface of the workpiece 10 in the neighborhood of the roots of the teeth being formed, and further ensures that on either flank of the teeth being formed, there is no reversal of sliding motion as forming proceeds. (The direction of relative sliding motion reverses as the point of contact passes through the pitch circle.)

The planet wheels 17 mesh with internal gear teeth on a common annular gear member 18. The carrier 16 and the annular gear member 18 are connected to or integral with respective externally toothed ring gears 16', 18'. The ring gears 16', 18' are drivingly connected, via respective gear trains 20, 21, to a common drive shaft 22 which is driven by a motor 23, conveniently an electric motor. The gear trains 20, 21 determine the relative rotational speeds of the carrier 16 and planet wheels 17.

Two opposed piston members 24 engage opposite sides of the workpiece 10 adjacent the central cylindrical bore therein, each piston member 24 having a hollow stem 25 with a bevelled external surface 25' at its end which engages the edge defined between the adjacent axial face of the workpiece 10 and the cylindrical bore therethrough. The space within the annular workpiece 10 is filled with hydraulic fluid (e.g. oil or grease). Each piston member 24 is slidably disposed within a respective cylinder 26 to which hydraulic fluid under pressure $P_0$ is applied at 27 to urge each respective piston member 24 towards the workpiece 10 and thereby urge the respective bevelled surfaces 25' into fluid-tight engagement with the opposite axial ends of the internal bore of the annular workpiece 10 and to apply forces thereto having both axial and radially outward components. The angle of bevel of the surfaces 25' is such that, as the piston stems 25 advance towards the workpiece 10, the radially outward components cause the requisite amount of radial expansion at the axial ends of the workpiece 10 to maintain the concentricity thereof and provide an even radial expansion of the outer curved surface of the workpiece. Preferably, the edges of the workpiece defined between the axial faces and the bore are chamfered, so that the seal formed with the bevelled end surfaces 25 is sufficiently strong to withstand the fluid pressure P developed within the workpiece 10, as described below.

Slidably disposed within the hollow stem 25 of each piston member 24 is a respective pressure intensifier piston 28 the larger diameter end of which is exposed to the pressure within the cylinder 26 and the smaller diameter end of which is disposed within the hollow stem 25 and exposed to the pressure within the workpiece 10. When the external hydraulic pressure $P_0$ is applied within the cylinders 26, then provided the hydraulic intensifier pistons 28 are floating (i.e. not abutting the end wall of the piston member 24), they produce a proportionally greater pressure P in the hydraulic fluid which fills the space within the annular workpiece 10, the pressure P applying radially outward forces to the workpiece 10 to obtain the requisite radial expansion.

In FIG. 5 only one of the cylinders 26 on the left of the figure is shown in full, but it will be understood that the other cylinder 26 to the right of FIG. 5 is of identical construction.

On application of the supply pressure $P_0$ the stems 25 advance into the workpiece, reducing the volume within it, so that the intensifier pistons 28 are forced back to the "floating" position. The annulus is expanded by a combination of the pressure of the bevelled surfaces 25 on the workpiece and the hydraulic pressure $P_0$ within it.

The opposite movements of the piston members 24 are equated to each other by an external hydraulic system. This system ensures that the volumes of low pressure oil which fills the two spaces 29 of the two cylinders 26 enclosed by the smaller area sides of the piston members 24 are always equal to each other. The application of pressure within the two spaces 29 also serves to retract the piston stems 25 from the workpiece 10 after forming has been completed.

In FIG. 6 an alternative form of the invention is shown. A pair of coaxially mounted opposed pistons 32 are arranged for movement towards one another to compress between them an annular workpiece 10 the axial ends of which are located in cylindrical bores 33 provided in a fixed casing 36.

The workpiece 10 is located between the opposed faces of the pistons 32 upon a mandrel 34 having its opposite ends slidably located in coaxial blind bores 35 in the pistons 32. The workpiece 10 is also restrained by the cylindrical bores 33 which permit radial expansion of the workpiece along part only of its length.

As in the apparatus of FIG. 5, ring and planetary gear wheels 17 within the casing 36 are disposed around the space between the cylindrical bores 33 and coresponding to that part of the length of the workpiece 10 which is free to expand radially.

On radial expansion of the workpiece 10 under axial pressure from the pistons 32 the outer surface of the workpiece 10 comes into engagement with the planetary gear wheels to be formed by them into a corresponding toothed profile as in the apparatus of FIG. 5.

To ensure equal movement of the pistons 32 in the opposite direction to one another, the pistons 32 are located against two blocks 37 which are connected to the casing 36 by a pair of lazytong linkages 39. Each linkage 39 has a fixed pivot 41 fast with the casing 36 and connects the casing 36 to respective trunnions 42, 43 on the blocks 37. In operation the blocks 37 are pressed towards one another by a system using hydraulic fluid in the manner of an hydraulic ram.

The approach of the pistons 32 towards one another is limited to a desired value by a stop member or members 44 of appropriate length placed within the blind bores 35 in the pistons; a minimum separation between the pistons 32 is reached when the stops 44 and the mandrel 34 are in abutment with the stops 44 hard against the blind ends of the bores 35.

FIG. 7 shows a further embodiment of the invention, which is suitable for producing for example splined shafts or gears of large face width. The top half of the figure is a part section through the apparatus with the workpiece about to be formed, and the bottom half shows the workpiece during forming.

There is provided a fixed expanding mandrel 50 having a cylindrical shank 52 supported by fixed structure (not shown), a cylindrical nose portion 54 of relatively small diameter, and an expander portion 56, the diameter of which increases along the axial length thereof to form a curved outer surface. The maximum diameter of the expander portion 56 is somewhat greater than the diameter of the shank 52.

Circumferentially disposed around the expander portion 56 and radially spaced therefrom are a number of rotatable toothed planet wheels 17, which are identical to and driven in the same manner as those of FIGS. 4 and 5 and will thus not be described in detail.

A hollow cylindrical workpiece 10 is mounted as a sliding fit on the nose portion 52 of the mandrel, and a ram 58 is provided to propel the workpiece along the mandrel in direction shown by arrow F, forcing it over the expander portion. A tensile hoop stress is thus imparted to the portion of the workpiece passing over the expander portion 56, and that portion is forced into contact with the toothed planetary wheels 17. The planetary wheels repeatedly indent the stressed portion of the workpiece and form conjugate teeth thereon as described with reference to FIGS. 4, 5 and 6.

Spur teeth or straight splines are formed if the workpiece is not rotated relative to the mandrel. Helical teeth or splines are formed if the planetary wheels 17 are provided with helical teeth and the workpiece is rotated at a rate appropriate to its rate of linear feed along the mandrel.

The face width of the toothed planet wheels 17 and the axial extent of the expander portion 56 are relatively located, so that the workpiece 10 is worked primarily in the portion thereof under tensile stress.

The maximum diameter of the expander portion 56 is rather greater than that of the shank to allow recovery of the elastic component of the expansion of the workpiece. If this were not so the workpiece would contract onto the shank 52, making a greater ram force necessary to propel the workpiece. The face width of the planetary wheels 17 may thus be greater than the axial extent of the expander section 56, since the workpiece contracts out of engagement with the planet wheels upon passing the point of maximum diameter of the expander portion.

There is provided one or more tip trimming tools 60 for trimming the circumferential surface of the formed workpiece. The tool 60 can advantageously rotate with the planet carrier 16, but must of course be disposed axially behind the planet wheels 17. The tool 60 is necessary when forming certain gear teeth to remove malformations that occur during the final stages of forming.

Figure 9:
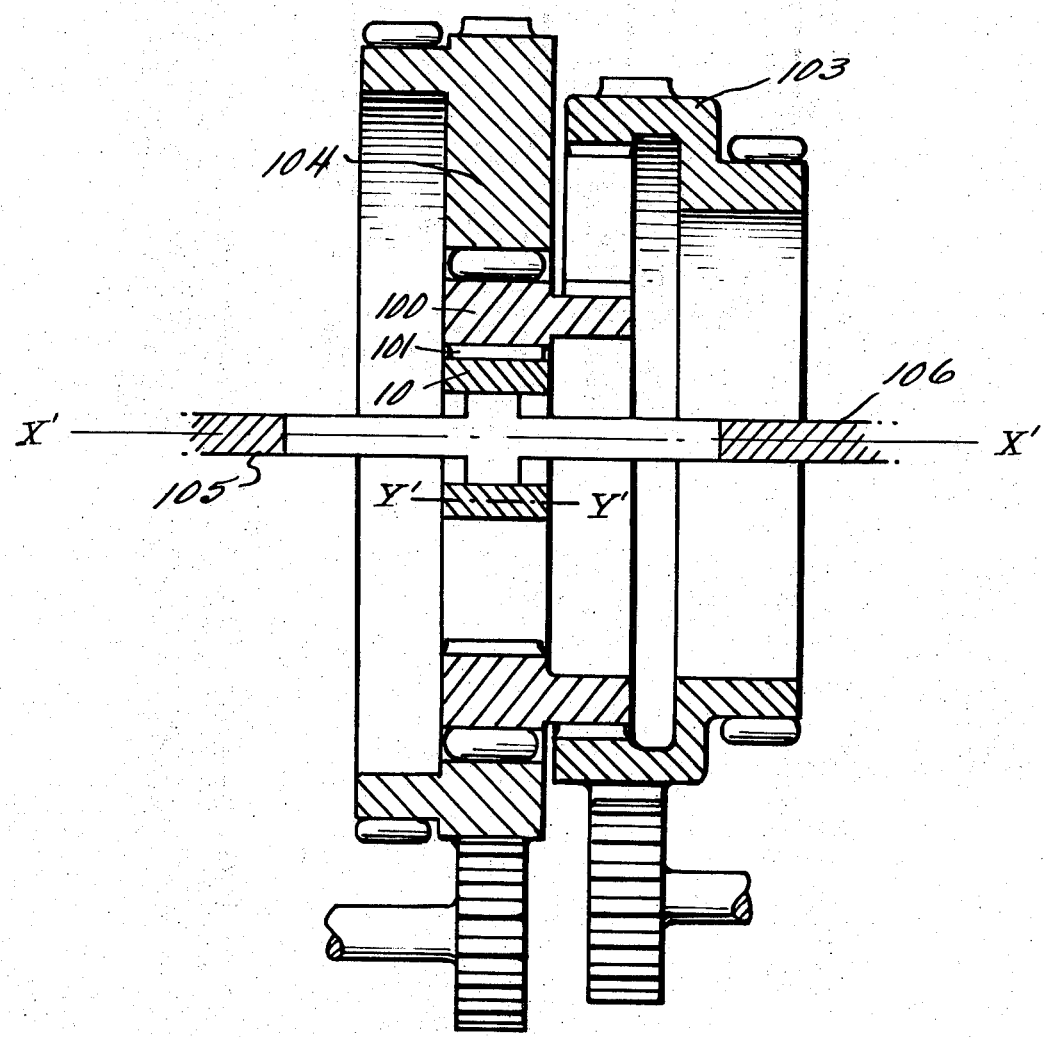
FIG. 9 shows a diagrammatic section through a part of an apparatus according to a yet further embodiment of the invention.

An alternative construction to that of FIGS. 4 to 7 may be adopted to form the teeth on the workpiece 10 and this construction is shown in FIG. 9. Instead of planet wheels 17, a ring gear 100, having forming teeth 101 on its radially inner surface of form conjugate to that desired on a workpiece 10, encircles the forming space, the ring being driven for rotation about its axis Y'—Y' which is eccentrically disposed about the axis X'—X' of the workpiece 10 by shaft 103 and rotated about the axis X'—X' by shaft 104. The workpiece 10 is expanded by rams 105, 106 into contact with the forming teeth of the ring gear, which by suitable choice of rotational speed is caused to roll around workpiece. The motion is of course analogous to that of the ring gear 18 and the planet wheels 17 of FIGS. 4 and 5.

A further refinement of the embodiments of FIGS. 4 to 7 is the provision on the flanks, but not on the tips, of the forming teeth 15, of cutting edges similar to those used on a gear shaving machine. The function (i) hereinbefore discussed is performed by the cutting edges while function (ii) continues to be performed as before by the tips of the forming teeth 15. This refinement is particularly useful when forming helical gears or splines by the embodiment of FIG. 7.

FIG. 8 shows a modification of the apparatus of FIG. 7. There is again provided a fixed mandrel 50 and a ram 58 as in FIG. 7, but instead of planetary wheels 17 and the associated drive mechanism there is provided a forming tool comprising one or more press tools 62 angularly disposed around and radially spaced from the expander portion 56 of the mandrel. The press tools are each pivoted about respective fixed points 64 for pivotal movement in respective planes passing through the axis of the mandrel and the respective fixed points. The press tools each have an arcuate operative edge 66 which is centred on the respective fixed point 64 and is shaped to impart the desired form to the workpiece. Means not shown are provided to apply a force P to the press tools in the direction shown.

In operation, the workpiece 10 is forced over the expander portion 56 as in the FIG. 7 embodiment by means of the ram 58, and is expanded into contact with the operative edges 66 of the press tools 62. The means applying the force P to the press tools is connected with the ram 58 so that the press tools rotate in the direction of the arrow R at a rate matched with the feed rate of the ram. The operative edges of the press tools thus move over the expanded surface of the workpiece which is under tensile hoop stress, forming it into the desired shape. The force P applied to the press tools causes them to urge the workpiece along the mandrel. The force required to be supplied by the ram is thus reduced.

The apparatus is illustrated as producing straight splines on the workpiece, but helical splines can be produced by inclining the planes of the press tools to the axis of the mandrel, and rotating the workpiece at the rate consistent with the linear feed rate.

It will be appreciated that if desired the press tools 62 may be complete discs instead of sectors thereof, enabling long lengths of splined or toothed tubing to be produced. The force P would be applied to each disc by applying a torque about its axis of rotation.

The apparatus shown in FIGS. 4 to 8 may be applied to the formation of gear teeth of any desired profile, including helical, spur, involute and Novikov gears.

It will of course be appreciated that those embodiments of the invention wherein pressure is applied to the workpiece via hydraulic fluid directly in contact therewith are suitable only for cold forming, since the hydraulic fluid would be destroyed by contact with a workpiece at a high temperature.

I claim:

1. A method of forming a tubular workpiece comprising applying radially outward forces to the inner curved surface of the workpiece over successive axially spaced portions thereof so that said portions are radially expanded and a tensile hoop stress is developed in the outer circumferential surface thereof, and substantially simultaneously, moving a forming tool relative to said portions to effect forming the circumferential surfaces of said portions under conditions of plastic flow.

2. A method of forming an annular workpiece comprising moving a forming tool relative to at least a part of the periphery of the workpiece and substantially simultaneously applying a tensile hoop stress to the outer circumference of the workpiece by subjecting the workpiece to the combined effect of the application of hydraulic pressure in the space within the workpiece and of compressive forces applied axially to the end faces of the workpiece, whereby forming is effected under conditions of plastic flow.

3. Apparatus for forming a tubular workpiece comprising an expander mandrel insertable within the workpiece, and means to relatively axially move the mandrel and the workpiece so as to radially expand successive axial portions of the workpiece, and a forming tool so positioned as to form each portion of the workpiece during expansion thereof.

4. Apparatus for forming an annular workpiece comprising a workpiece holder, and a forming tool to form indentations in the edge of the workpiece, the workpiece holder including a ram device to apply a compressive force to the radially inner portion of the workpiece to cause a tensile stress in the periphery thereof, the ram device including hydraulic intensifier piston means to intensify the applied hydraulic pressure, fluid being contained within the annular workpiece to transmit the intensified pressure to the inner curved surface of said workpiece, means to move the forming tool relative to the workpiece to form the latter.

5. Apparatus for forming an annular workpiece, comprising a workpiece holder, a forming tool mounted for movement relative to the workpiece, means to effect said relative movement, two pistons arranged on opposite sides of the workpiece, means for moving said two pistons towards the workpiece when said relative movement occurs to apply opposed axial compressive forces thereto so as to expand the workpiece radially and cause plastic flow in its periphery and a lazy tongs linkage to constrain the pistons to equal and opposite movement.

6. Apparatus for forming an annular workpiece comprising a workpiece holder, and a forming tool to form indentations in the edge of the workpiece, the workpiece holder including a device to apply a compressive force to the radially inner portion of the workpiece to cause a tensile stress in the periphery thereof, the forming tool comprising an internally toothed ring rotatably about its axis of symmetry, which axis may itself rotate about the axis of symmetry of the workpiece, the internally toothed ring on rotation thereof and of its axis and expansion of at least a portion of the workpiece forming spaced apart indentations in the edge of the workpiece.

7. A method as claimed in claim 1 wherein an expander mandrel is disposed within the workpiece, successive axial portions of the workpiece being expanded by relative axial movement of the workpiece and the mandrel.

8. A method as claimed in claim 7 wherein the forming tool moves so as to aid the said relative axial movement during forming of the workpiece.

9. Apparatus as claimed in claim 3 in which the forming tool comprises a rotatable carrier having mounted thereon a plurality of rotatable toothed forming wheels the axes of rotation of which are parallel to the axis of rotation of the carrier, the workpiece holder holding the workpiece with its axis of symmetry coincident with the axis of rotation of the carrier, the toothed wheels, on rotation of the carrier and expansion of at least a portion of the workpiece, forming spaced apart indentations in the edge of the workpiece.

10. Apparatus as claimed in claim 9 comprising a trimming tool mounted for rotation with the carrier to trim the surface of each axial portion of the workpiece after the forming thereof.

11. Apparatus as claimed in claim 4 in which the ram device further comprises an outer piston to which said hydraulic pressure is also applied, the outer piston having a hollow stem within which the hydraulic intensifier piston is slidably disposed, said outer piston comprising means to engage the workpiece sealingly and to exert a thrust having an axial and a radially outward component on an axial end of the workpiece, the radially outward component assisting in providing an even radial expansion of the outer curved surface of the workpiece.

12. Apparatus as claimed in claim 3 wherein the forming tool is rotatably mounted about a fixed point, the operative edge of the tool rolling in operation on the expanded portion of the workpiece, forming an indentation therein and aiding said relative movement of the workpiece and the mandrel.

References Cited

UNITED STATES PATENTS

| | | | |
|---|---|---|---|
| 1,625,340 | 4/1927 | Thomas | 72—399 |
| 2,679,089 | 5/1954 | Opitz et al. | 29—159.2 |
| 3,286,498 | 11/1966 | Cogan | 72—61 |
| 3,355,930 | 12/1967 | Fedorov | 29—159.2 |

LOWELL A. LARSON, Primary Examiner

U.S. Cl. X.R.

72—97, 102, 370